United States Patent [19]

Cogley

[11] 3,950,552

[45] Apr. 13, 1976

[54] METHOD FOR PRODUCING A POME FRUIT SAUCE WITH ELECTRONIC INSPECTION OF DICED FRUIT

[75] Inventor: Jeremiah Richard Cogley, Arendtsville, Pa.

[73] Assignee: Knouse Foods Cooperative, Inc., Peach Glen, Pa.

[22] Filed: Aug. 2, 1974

[21] Appl. No.: 494,067

Related U.S. Application Data

[63] Continuation-in-part of Ser. No. 160,723, July 8, 1971, abandoned, which is a continuation-in-part of Ser. No. 791,525, Jan. 15, 1969, abandoned.

[52] U.S. Cl. ............... 426/231; 426/482; 426/484; 426/518; 426/287
[51] Int. Cl.² ................................... A01K 43/00
[58] Field of Search .......... 426/270, 286, 287, 324, 426/372, 377, 378, 379, 388, 478, 479, 481, 482, 484, 589, 615, 518, 231, 233; 209/73–75

[56] References Cited
UNITED STATES PATENTS

| | | | |
|---|---|---|---|
| 2,744,016 | 5/1956 | Grab | 426/270 |
| 2,768,900 | 10/1956 | Vertner | 426/324 |
| 3,169,564 | 2/1965 | Harrington | 426/287 |
| 3,382,975 | 5/1968 | Hoover | 209/73 |

*Primary Examiner*—Norman Yudkoff
*Assistant Examiner*—Martin G. Mullen
*Attorney, Agent, or Firm*—Gardiner, Sixbey, Bradford & Carlson

[57] ABSTRACT

Apple sauce is produced in a continuous process stream without hand trimming by dicing the untrimmed, sometimes uncored fruit, electronically sorting the dices to reject blemished dices, and cooking and conventionally finishing the accepted blemish free dices. The reject dices are reduced to blemished and unblemished tissue by being either (1) rediced into smaller pieces and resorted, (2) sliced to further subdivide them while in an auxiliary processing path and returned to the process stream for resorting, (3) sliced to further subdivide them and resorted while in an auxiliary processing path whereafter surviving unblemished tissue is returned to the process stream, or (4) blemished dices from the original sorting or from the resorting of step 3 are routed to a separate cooker and fine screen finisher to produce a nearly blemish free fine sauce which in turn is blended with the conventionally finished sauce produced from the accepted dices. The fruit may be lye peeled prior to dicing.

13 Claims, 1 Drawing Figure

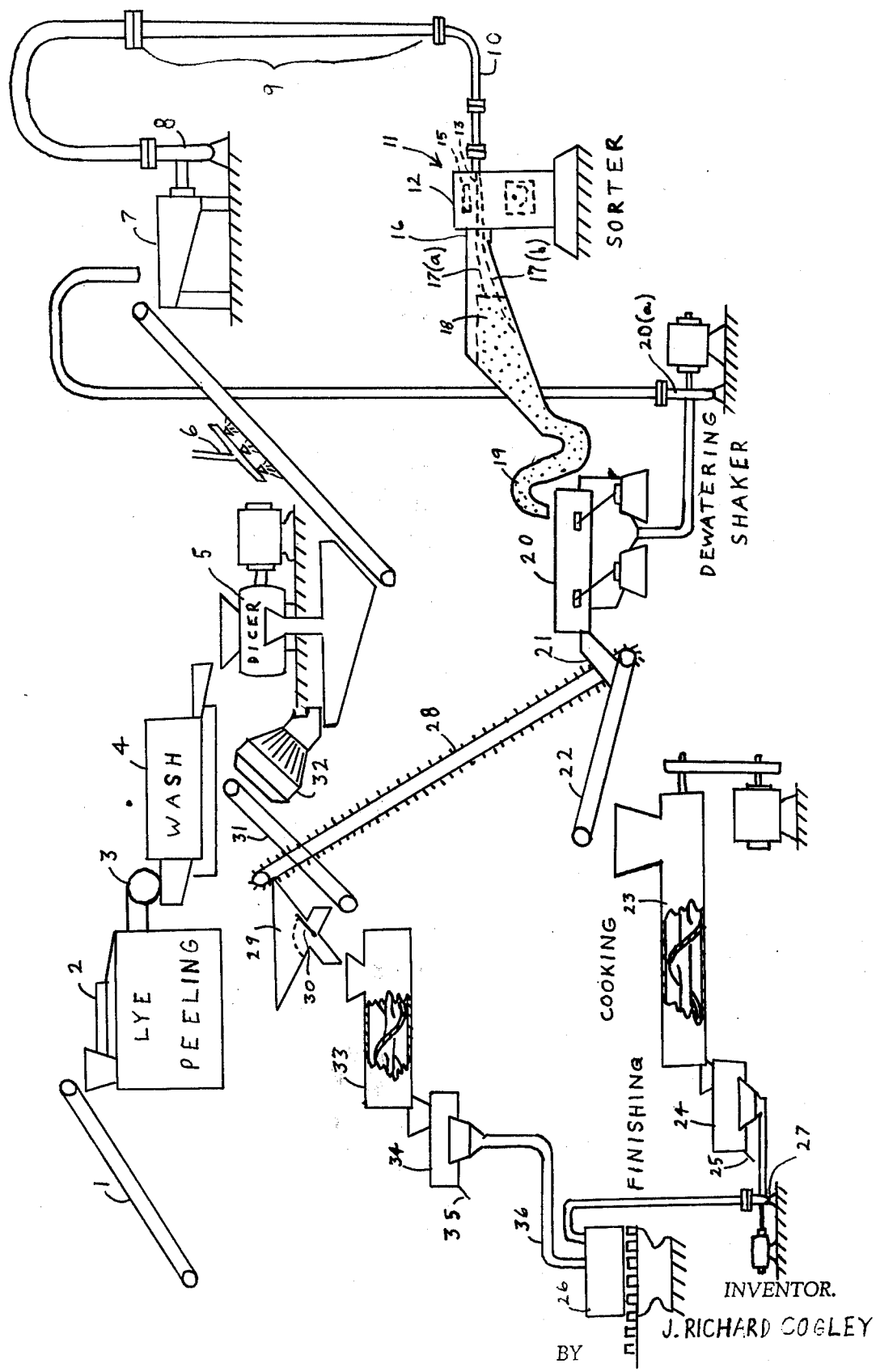

METHOD FOR PRODUCING A POME FRUIT SAUCE WITH ELECTRONIC INSPECTION OF DICED FRUIT

RELATED APPLICATIONS

This is a continuation-in-part of application Ser. No. 160,723, filed July 8, 1971, now abandoned, which in turn is a continuation-in-part of application Ser. No. 791,525, filed Jan. 15, 1969, now abandoned.

BACKGROUND OF INVENTION

Common Commercial Practice

This invention relates to an improved process of producing a sauce from a pome fruit, particularly apples.

The commercial production of apple sauce conventionally comprises the process steps of (1) washing the raw fruit, (2) manually assorting the raw fruit to remove fruit so severely blemished or misshapen as to preclude machine peeling, (3) assorting to size to accommodate machine peeling, (4) machine peeling and removal of core with its blossom end, (5) manual trimming to selectively remove blemishes (including surviving blossom ends) from the fruit, (6) slicing or chopping to promote rapid heat penetration during subsequent cooking (Apples and Apple Products, Smock & Neubert, page 302), (7) if sliced, the slices may optionally be subjected to a final manual inspection and selective surface area trimming, (8) cooking, and (9) finishing.

Two extremely costly factors are involved in the conventional process, namely the direct labor involved in the tedious selective trimming and the loss in yield of edible fruit through the operation of peeling and coring machines and, to an even greater extent, in the manual steps of selectively trimming defects from the surface of the peeled fruit and/or the sliced fruit. Similarly, the most wasteful steps from the standpoint of loss of yield are these same steps wherein mechanical peeling removes much edible tissue along with the skin, and coring removes a ½ or ⅝ inch cylindrical core extending diametrically through the fruit. Moreover, selective surface area trimming is inherently wasteful inasmuch as a manual trimmer is required to maintain a speed of operation which precludes the exercise of sufficient care to avoid removal of edible tissue surrounding the defect. Weight losses in mechanical peeling and coring steps normally represent from 30 to 40 percent of the weight of the fresh fruit (Commerical Fruit and Vegetable Products, W. V. Cruess, McGraw-Hill, 1938, p. 153).

The industry has been well aware of the losses involved in mechanical peeling and manual trimming, and has given attention to such proposals as chemical peeling with disappointing results. Even beyond problems of variable results occasioned by variations in variety and maturity of the raw fruit were two particularly troublesome impediments.

First, while a distinct saving in waste was realized in the chemical peeling step itself (as compared to mechanical peeling), the saving proved to be a false economy, especially with low quality lots of fruit, for it did not survive the subsequent steps in the process. When chemically peeled fruit with a high level of defects such as bruises or hail marks reached the subsequent manual trimming step, the fact that surface blemishes were much more evident caused the trimming workers to remove more tissue to the extent that a net loss was encountered.

Thus, chemical peeling did not significantly reduce the waste in coring (removal of the calyx end by coring or extremely deep cutting remained necessary) and increased the waste incurred in the step of selective surface area (manual) trimming.

Secondly, chemical peeling was ineffective to remove deepseated vestigial stamens, particularly in fruit varieties characterized by a deep calyx.

While the finisher commonly employed in presently accepted processes is effective to remove hard tissue such as seeds or the carpel tissue (commonly called "seed cell") of the core, as well as the hard tissue of flesh defects, it does not remove fruit portions which are visually objectionable but are of such small size or soft character as to pass through the screen of the finisher. Prominent among these last-mentioned objectionable portions is the aforementioned blossom or calyx end of the fruit. This blossom end includes a plurality of short, thin filamentary organs which are the vestigial stamens of the original blossom. While these vestigial organs are harmless and virtually indiscernible insofar as taste or eating qualities are concerned, they become extremely objectionable by virtue of the fact that their configuration and black color resemble that of an insect member, such as a fly leg.

While normal coring of the fruit removes a cylindrical segment from the fruit which comprises the core axis including the stem and the blossom ends, the effectiveness of this removal depends upon the accuracy of the orientation of the fruit in the machine during the coring operation. Whether this orientation is done manually by the machine operator or mechanically by the coring machine itself, it is subject to error which often results in the removal of a cylindrical segment which is not coaxial with the core and hence does not include the blossom end with the removed segment. Consequently, it is necessary to maintain sufficient manual trimming capacity following a coring operation not only to trim defects from other areas of the fruit but also to detect and selectively trim those blossom ends remaining on the fruit as a result of misalignment in the coring apparatus. In practice, this volume is sufficiently high to present a significant labor demand. When it is realized that a single blossom end includes approximately 20 vestigial stamens, it can be seen that the passage of one blossom end through the coring and subsequent visual inspection and selective hand trimming steps, and thus ultimately into the product, can downgrade a considerable volume of product from the standpoint of its acceptability to the consumer.

In addition to the matter of consumer acceptance, the U.S. Department of Agriculture scoring system for grading of apple sauce prescribes a maximum of three blossom ends (i.e., vestigial stamens) per 15 oz. of sauce for Grade A, and five blossom ends for Grade B. Hence, otherwise good quality sauce can be forced into a poor grade by this defect alone.

A further problem in currently practiced methods of sauce production is the loss of usable fruit flesh incurred in mechanical coring. Studies conducted on a pilot plant scale reveal that 77% of the mechanically removed core consists of usable fruit tissue. This tissue, if recoverable, amounts to approximately 10% of the total fruit weight. This invention permits the use of the whole uncored fruit without otherwise attendant problems of increased hand trimming requirements.

Another significant loss of flesh is inherent in the mechanical peeling of fruit by machine. Even with careful adjustment of the depth of cut of the peeling knife, losses of as high as 30% are incurred, particularly in the smaller fruit sizes. This inventor's initial experimental work with lye peeling of apples was somewhat disappointing inasmuch as the saving in weight loss was partially offset by the fact that more trimmable defects survive lye peeling than do mechanical peeling, hence the lye peeled fruit suffers correspondingly greater loss at the hands of hand trimmers under present preparation processes. Weight loss studies indicate that initial savings of from 7.8% to as high as 25.4% attainable by lye peeling were offset by as much as a 3.2% increase in loss at the hands of manual trimmers. The present invention enables the use of lye peeling without subsequent hand trimming, and reduces the loss after peeling to 1.1%.

Even more apparent than the foregoing problems in existing techniques is that of the direct labor involved in operation of coring and peeling machines and in visually selecting and manually trimming the surface of the fruit thus prepared. Typical of plant operations is that of a plant comprising 32 peeling and coring machines wherein the preparation (i.e., peeling, coring, inspecting and trimming) of the fruit requires the services of 168 persons.

BACKGROUND OF INVENTION

Prior Patent Art

Deviations from the foregoing commercial practices seeking to reduce weight loss or labor requirements have been proposed. For instance, E. G. Grab, in U.S. Pat. No. 2,744,016 issued May 1, 1956, discloses a method of making sauce with uncored apples, but includes as one of the initial treatment steps the efforts of human "operators who either through mechanical, chemical or physical means remove the blossom end of the apples". This step is essential to the Grab process, for no subsequent step is disclosed which would satisfactorily remove blossom ends deliberately left in place on substantial numbers of fruit. Specifically, the whole fruit, with blossom ends selectively removed, is fed through a chopper after which the particles are subjected to flotation separation (of loose stems and seeds) and to further manual inspection where blemished particles are returned to the trimmers. The acceptable fruit particles are then shredded and again subjected to flotation separation for further removal of loose stems and seeds, and still further manual inspection.

S. L. Crawford, in his U.S. Pat. No. 1,910,754 refers to cutting uncored apples into small pieces, chunks, slices or choppings, but states that this is done after removing all stems, blows (blossom ends) and soft spots or rotten portions, apparently by hand.

The use of electronic sorters for elimination of blemished dices from diced fruit or vegetable products is disclosed in Baigent U.S. Pat. No. 3,212,821 and Hoover U.S. Pat. No. 3,382,975. Neither of these patents suggest a process wherein dices are produced as an intermediate step and solely for the purpose of utilizing electronic sorting, and are later destroyed in form during the manufacture of a sauce.

OBJECTS

This invention has among its objects the provision of a method and apparatus for producing a pome fruit sauce wherein:

1. a fruit sauce is prepared having improved characteristics of freedom of defects, particularly in the nature of particles of seeds, vestigial blossom parts, flecks of bruised tissue, peel, and portions of carpel tissue,
2. a fruit sauce is prepared by a method which avoids substantial loss of edible tissue located in and around the core of a pome fruit,
3. a fruit sauce is prepared by a method which eliminates peeling of light skinned fruits or incorporates chemical peeling methods to significantly reduce peeling loss as compared to process including mechanical peeling and/or subsequent hand trimming,
4. a fruit sauce is prepared by methods which eliminate hand trimming of selected surface areas of individual fruits,
5. a fruit sauce is prepared by method which enables inspection and sorting of blemished segments to be accomplished by automated machinery, thus eliminating human inspection, and
6. a fruit sauce is prepared wherein fruit segments including defects are separated, passed through a distinct cooker and fine screen finisher, and the resultant sauce is blended into the final product.

BRIEF

In general the process of this invention comprises the steps of dicing the untrimmed and preferably uncored fruit, washing the diced fruit to remove seed particles, flecks from bruised tissue, peel and portions of carpel tissue, and subjecting the washed dices to electronic sorting which senses the presence of any contrasting color on a dice and removes the blemished dice, and subsequent cooking and finishing operations. In alternate embodiments, the blemished dices may be recycled for dicing into smaller segments and resorted to obtain removal of smaller segments and thus reduce loss, or the blemished dices may be subjected to a separate distinct cooking and fine finishing operation after which the resultant sauce is blended into the final product.

In the case of fruit with contrasting skin color wherein the presence of the skin on a dice would result in its being sorted out as a blemished dice, it is appropriate to precede the aforementioned steps with the step of peeling the fruit. Thus, in ensuing description the step of peeling will be included, it being understood that the peeling step may be omitted in the case of processing light skinned varieties of fruit. In the latter instance, dices including skin and no dark blemishes are passed to the cooking and finishing operations, wherein skin is removed in tailings by the finisher.

TERMINOLOGY

In the foregoing objects and brief and in the ensuing specification and claims, the term "selected surface area trimming" is to be understood to refer to that type of trimming wherein a surface area of a fruit, which area includes a defect, is selected and trimmed so as to free the fruit of the selected defect by the removal as extraneous matter of only that tissue closely surrounding and including the surface defect. Such trimming is generally done manually with the use of hand held "paring" knife having a blade of semi-circular cross section, but can be done mechanically as by a water powered rotating knife blade, for example a "Hydrout" as manufactured by Magnuson Engineers. In any event, the trimming involves discrimination in the selection of a surface area including a defect and removal of only that selected area, as distinguished from a coring operation which removes a core of tissue extending entirely through the fruit.

Further, the term "dicing" is to be understood to refer to the cutting of the entire fruit into segments of relatively uniform size and configuration having substantial three dimensional or cubic dimensions throughout as distinguished from random chopping or slicing. Stated in another way, each of the three dimensions is a substantial dimension throughout the segment. It is recognized that dices cut from the outer surface of the fruit will have a least one surface of curved or irregular configuration and thus are within a range of permissible variance from the foregoing definition.

DESCRIPTION OF INVENTION

For a more complete understanding of the invention, reference is made to the ensuing specification and to the drawing, which comprises a diagramatic representation of a preparation line utilizing the apparatus and practicing the process of this invention.

The present invention consists of a process wherein the need for the costly and wasteful step of manual trimming (herein called "selected surface area trimming") is obviated and hence the step may be eliminated. While it is the elimination of this step which is the principal distinguishing feature and advantage of the invention, numerous other steps have been altered and/or added to the process in a noval manner in order to produce an acceptable (in fact, superior) sauce despite the elimination of a formerly requisite step, indeed what could properly be said to be the major step in previously-known processes.

Specifically, the altered and added steps comprise (a) dicing the entire fruit to an intermediate (not the final product) form having uniform size and substantial cubic dimensions particularly well suited for singulating (arrangeing in single file), (b) establishing a spaced file product stream, and (c) electronically inspecting and assorting the dices to remove blemished dices from the main processing stream. The blemished dices may then be mechanically further subdivided, as by redicing into smaller segments and resorting, or by transverse slicing in an auxiliary processing path after which they are simply returned to the main processing stream ahead of the assorter. A blemish-free subdivided portion is passed by the assorter as acceptable along with the main product stream and blemished dices are again removed for further subdivision in the auxiliary processing path. Eventually, repeated subdivision results in a segment so small as to be removed in the conventional screening and dewatering apparatus 20. In a third alternative, the blemished dices are also mechanically subdivided as by slicing in the auxiliary path and are subjected to electronic assorting in the auxiliary processing path, only the surviving unblemished dices being returned to the main process stream. Blemished dices are utilized in by-products such as apple concentrate, vinegar, chips, etc. The fourth alternative is a process in which the blemished dices from the assorting step (c) or from the auxiliary path are cooked and subjected to a finisher which is distinct from the main finisher and characterized by a fine mesh screen. The mesh (0.030 inch or smaller) is sufficiently fine to remove defects including blossom ends not removable by a conventional finisher screen, but produces a sauce of unacceptable consistency and finish. However, by reintroducing the finely finished sauce into the relatively coarsely finished sauce of the main product stream to produce a blend of as high as 30 percent constituent of the auxiliary path, an acceptable product is obtained.

Specifically, the process comprises the following steps:

PEELING

The raw fruit, after appropriate grading for size, culling, blending of varieties and other preliminary handling in accordance with conventional practices, is carried by conveyor 1 to a peeler 2, such as a lye peeler.

Here the raw fruit is subjected to a lye solution under steam pressure for a time and at a caustic concentration which varies in accordance with the horticultural variety of the fruit and with other conditions, such as fruit maturity. Inasmuch as apple sauce conventionally comprises a blend of varieties of raw product chosen to impart the desired characteristics to the finished sauce, it has been found appropriate to adjust the treatment to accommodate the most difficult to peel variety in the blend. A commonly used blend includes, as its most difficult variety to peel, the York Imperial, in which instance an optimum peeling treatment requires immersing the fruit in a 15% caustic concentration at 160° F. followed by exposure to 30 P.S.I.G. in a closed chamber for 2 to 3 seconds contact time. Experimentation has indicated that a range of 2-5 minutes in caustic will satisfactorily accommodate most varietal and maturity variations. A sudden release of the pressure as the fruit is discharged from the chamber, as by a rotary pocketed valve 3, which is commonly used in the food processing industry, serves to pop out loose decayed tissue and some bruised tissue from the fruit surface.

WASHING

Promptly upon discharge from the pressure lye chamber the fruit is subjected to washing in a rotary drum type powered brush, spray washer 4. This treatment effectively removes residual lye, loose peel, the "popped out" tissue, and any loose foreign matter. While strong cutting sprays are helpful in removal of the aforementioned materials and defects, and also remove sufficient calyx end material to give an outward appearance of complete cleaning of the lye softened calyx, attempts to make sauce with the fruit at this stage of preparation produced a sauce including a large number of calyx end defects. Apparently these calyx end organs extend deeply enough into the fruit to escape contact with the lye, for satisfactory removal was obtained only with mechanical means, as by coring, hand trimming (i.e., selected surface area trimming), or by the use of a water powered rotating knife blade. Thus, washing alone was found to be insufficient as a preparation step leading directly to finishing. Further removal of defects, particularly calyx end defects, is essential to the production of an acceptable product.

DICING

To the end that manual effort and trimming inherent in selected surface area trimming may be eliminated completely from the process, the fruit is next transformed to a form susceptible of electronic scanning and automatic assorting to remove blemishes, particularly calyx or blossom end defects. This is done by passing the fruit through a dicer 5 of conventional design, which produces dices of relatively uniform size and configuration having substantial three dimensional or cubic dimensions throughout and including surfaces which are substantially planar. Optimum size of the dices has been found to involve minor dimensions approximately ½ × ½ inches and a major dimension in the range of ¾ to 3 inches. While the specific size is not critical, smaller dices (e.g., ½ × ½ × ½ inches) have been found to cling together and thus complicate subsequent processing steps. Dicing of this nature can conveniently be carried out with the use of a machine such as disclosed in Urschel et al U.S. Pat. No. 3,512,588.

WASHING

The diced segments are washed in a shaker type spray washer (indicated diagramatically at 6) or by immersion in a conveying fluid as in pump tank 7. This washing serves to remove loose material resulting from the dicing operation, which material comprises primarily seed bits. If allowed to remain clinging to the dice surface, these seed bits would be detected as defects and result in automatic rejection of an otherwise acceptable dice. The washing also removes smaller, non-cubical pieces prior to electronic sorting.

ELECTRONIC SCANNING AND AUTOMATIC SORTING

The washed dices are now ready for sorting to remove blemished disces. The blemishes which are now of concern (i.e., blossom end segments, dark bruises, etc.) are characterized by a dark appearance which contrasts vividly with the normal light flesh. To the end that dices so blemished can be removed at a speed and effort commensurate with an economical processing operation, this invention employs an electronic sorter, such as the Sortex 621 Wet Sorting Machine, as manufactured by the Sortex Company of North America, Inc., Lowell, Michigan, 49331, or the Hydro-Sorting Machine HSS-100, Model 369302 as manufactured by Mandrel Industries, Inc., a subsidiary of Ampex Corporation, 6909 Southwest Freeway, Houston, Texas, 77036. The latter will be described briefly in the ensuing specification, and reference may be had to U.S. Pat. No. 3,382,975 for a more complete description thereof. This sorter is effective to detect variances in reflectance from that of the normal flesh of the dice and to remove the so detected blemished dice from the normal product flow stream by air blast.

For successful operation of the sorting apparatus, it is essential that the dices be passed serially through the electronic inspection and automatic rejection apparatus in single file. obviously, if two dices were to pass simultaneously (i.e., side by side) a defect on either juxtaposed surface would pass undetected and, if a defect is detected on the dice, operation of the ejector would remove not only the blemished dice but also its adjacent dice, whether blemished or not.

The configuration of the dice produced in the aforementioned dicing step lends itself particularly well to orientation in single file, i.e., singulating, and to a maximum capacity of efficient operation of the sorter. To this end, the dices are placed in a transparent conveying fluid, as in receiving tank 7, from which the dices and conveying fluid are picked up by a solids pump 8 and pumped through a conduit including a singulating transition section 9. This singulating section comprises a length of conduit characterized by a gradually diminishing cross sectional area which combines with the inherent tendency of a solids pump to orient and maintain the dices in single file. Within this section, dices orient themselves with their major axis coincident with the path of travel, i.e., the conduit axis. At the same time the conveying fluid accelerates evenly throughout the singulating transition section due to the narrowing of the conduit. Hence, as each dice passes through this section, it tends to move away from the next succeeding dice and to maintain a space therebetween. For a more complete description of this phenomena, reference may be had to U.S. Pat. No. 3,361,173 issued Jan. 2, 1968 to F. G. Lamb.

At this point, the dices have attained an orientation, spacing and manner of conveyance which presents their major surfaces to the side of the conduit for scanning in the sorter, maintains a spacing between dices which enables the sorter to reset between dices and to detect blemishes on either the leading or trailing minor surface, and provides an optimum single file product density. The exit portion of the transition section 9 and the feed conduit in from that point to the sorter 11 has an inner diameter only slightly larger than the minor axis dimensions of the dices, thus maintaining the single file orientation and maximum product density within the conveying fluid.

As more fully described in the aforementioned U.S. Pat. No. 3,382,975, the sorter comprises a drum shaped viewing chamber 12 which surrounds a transparent conduit section 13 which is an extension of the feed pipe 10. Disposed concentrically around the transparent section 13 are a plurality (five) photomultipliers 14 and, diametrically opposite each multiplier, background elements 15. Additionally, three sets of two diodes (not shown) serve to monitor the entrance and exit ends of the viewing chamber 12.

As a dice enters the viewing chamber, it passes by a sensor (not shown) which detects its presence and initiates a sort cycle. At this instant each of the five photomultipliers 14 has been viewing light reflected from the background element 15 diametrically opposite it, and initiation of the sort cycle causes the electronic value of the background element to be stored in a memory circuit. As the dice continues its passage through the viewing chamber, it passes between the photomultipliers 14 and their respective element 15 where it is viewed simultaneously by all five photomultipliers. Each photomultiplier 15 measures the reflectivity of the dice surface under view and derives an electronic signal which is compared with the previously stored background element signal. If the reflectivity of the dice surface is equal or greater to that of the stored background signal, the dice is considered acceptable, or unblemished, and passes through an ejector 16 which remains inactivated. If, on the other hand, the reflectivity of the dice is less than that of the stored background signal, it is considered to be blemished and ejector 16 is activated to direct a blast of compressed air against the side of the dice and alter its course when leaving the ejector.

As previously mentioned, the relatively uniform size and configuration of the dice lends itself particularly well to singulating and assorting. In the way of explanation, it is observed that the sorter must "reset" and store a background signal between each product element. In practice, this requires a 4-inch gap between segments. Hence, a large piece increases the capacity but risks incorporation of deep blemishes not evident on the surface. Also, the larger the piece, the more pieces will incorporate detectable defects and hence be removed, resulting in more subdivision in the auxiliary path. Raw apple tissue is somewhat brittle and, when subdivided, has a tendency to fracture and produce fine particles at the point of subdivision. These particles are lost by screening operations, etc., and hence diminish yield. Conversely, if the size of the unit is too small, the large share of sorter time is absorbed in the reset gap between segments, with an obvious reduction of efficiency. In the particular size dices set forth in the preferred embodiment, an optimum has been settled upon. But an optimum is unattainable if there is marked nonuniformity, for both extremes and their attendant disadvantages are always present.

Moreover, the fruit segments are conveyed in water for singulating and assorting. During this conveyance, a certain amount of leaching of solids (sugars) occurs and is lost from the ultimate product. A reasonably large segment is less susceptible to such loss, and nonuniformity includes high percentages of small pieces thus increasing loss of product solids.

Furthermore, electronic assorting requires a relatively clear liquid in order to reset on the target. The presence of small pieces results in more sloughing which clouds the water and interferes with reset. Large segments, as before stated, result in excessive subdividing and fracturing into small pieces which similarly interfere with sorting.

Finally, a preferred relationship of product unit size and conveying tube size eliminates "piggy-backing", or the tendency of two units to cling together and pass the detecting window together where a defect on one results in both being removed from the product line or where a defect on a contiguous abutting surface passes without being detected. The tube must, of course, be large enough to accommodate the largest unit. If markedly smaller sizes are also present, they have a tendency to piggy-backing which can be avoided only by uniform sized segments.

Upon leaving the assorter, i.e., downstream of the ejector 16, the dices are projected over paths 17(a) and 17(b) into a decelerator 19 which includes a longitudinal extending partition 18. Those unblemished dices which have not been acted upon by the air blast of the ejector 16 continue on a straight path 17(a) to one side, considered the accept side, of partition 18, whereas those blemished dices which have their course of projection changed by the ejector air blast follow a second path 17(b) to the other, or reject side of the partition 18. During their passage through the decelerator 19, both streams are reduced in speed and are subsequently discharged to a dewatering shaker screen 20 where the conveying fluid is collected and recirculated via pump 20(a). Shaker screen 20 includes a partition 21 which maintains the stream of accepts and rejects distinct, feeding the accepts to conveyor 22 and the rejects to conveyor 28.

The acceptable dices are then conveyed in the process stream to cooker 23 and processed through finisher 24 from whence they are pumped at 27 to filler 26, all in conventional fashion.

In order to reduce the waste of unblemished tissue present in the reject dices, the reject dices may be subjected to one or more of several different treatments by which they are reduced to smaller unblemished and blemished product constituents. In each instance, the reduction is indiscriminant in that it is not directed at a selected surface area of the dice which is blemished, hence requires no discrimination as to the location, extent, and nature of blemishes, thereon.

In one such treatment reject dices may be rediced into smaller segments and subjected again to sorting, but in preferred treatments the reject dices may take either of two courses, depending upon which embodiment of the invention is practiced. Hence, hopper 29 is depicted as having a diverter 30 whereby reject dices from conveyor 28 may be diverted to either of two courses.

In one preferred embodiment, dices are conveyed through an auxiliary processing path including conveyor 31 to a point where they are further subdivided as at 32 and returned to the process stream. This subdivision may be conveniently accomplished in a machine such as an Urshel bean cutter as disclosed in U.S. Pat. Nos. 1,794,743 and 1,993,197. As evident from these patents, the Urshel cutter orients the product and slices each unit transversely, without regard to the location, nature, or extent of any blemishes thereon. This subdivision produces at least two dices comprising in most instances one blemished dice and one or more acceptable dices. Upon return to the process stream and passage through the sorter, only the blemished dice, now reduced in size, is removed, thus diminishing the amount of fruit lost by removal of the blemished dice as a constituent in the product stream. As an alternative to resorting in the main product stream, the dices as discharged from slicer 32 could be subjected to electronic sorting in a by an additional assorter (not shown) positioned within said auxiliary processing path, the dices surviving the second sorting as acceptable dices being returned to the main product stream, preferably at 22, whereas reject dices are passed to cooker 33 for processing in accordance with the another embodiment, now to be described.

Reject dices to be processed in accordance with the the last mentioned embodiment are cooked at 33 and finished at 34. The finisher 34 comprises a finer mesh screen (0.030 inch) than the normal mesh (⅛, 7/64 or 3/32 inch) of the main finisher 24. As stated before, the finisher commonly employed (i.e., of normal mesh size) is not capable of removing fruit portions such as blossom ends which are of such small size or soft character as to pass through the screen of the finisher. However, the finisher 34 is sufficiently fine to remove defects including blossom ends with the tailings at 35, but of course produces a sauce at 36 which would be of unacceptable quality because of its fine finish or texture. However, by maintaining the finish at 24 at high levels of acceptability, the resultant blend of sauce from the two finishers can be maintained at acceptable levels, even when the sauce from finisher 34 approaches 30% of the total volume. A lower percentage is, of course, preferable.

The foregoing description of the invention has set forth a specific manner of accomplishing the various steps of the invention, but the invention is by no means so limited. The invention comprises a process involving a particular sequence of steps and an arrangement of apparatus for performing that method, and the scope of that invention is set forth in the following claims.

I claim:

1. A process for producing a pome fruit sauce, said process consisting essentially of the steps of
   A. introducing untrimmed fruit into a process stream wherein it is subjected to the steps of
      1. dicing the untrimmed fruit to produce fruit tissue in the form of dices of relatively uniform size and of a configuration having substantial cubic dimensions throughout and including dices with blemishes including blossom ends,
      2. washing the diced fruit to remove loose material resulting from the dicing operation, thereafter
      3. singulating and separating the dices,
      4. presenting the dices in a spaced single file product stream to an electronic inspection means,
      5. electronically inspecting and automatically assorting the dices to remove from said product stream said blemished dices including dices having blossom ends,
      6. passing the surviving unblemished dices along said process stream,
   B. providing an auxiliary processing path distinct from said process stream and
      7. passing said blemished dices through said auxiliary processing path and therein subjecting them to the following two steps, namely further subdividing the tissue thereof with random disregard of the location, extent and nature of blemishes thereon and returning at least the unblemished portion of the thus subdivided tissue to said process stream
   C. and
      8. cooking and finishing the unblemished dices and unblemished further subdivided tissue in said process stream whereby the heretofore essential step of subjecting the fruit tissue to selective surface area trimming is obviated throughout said process.

2. The process of producing a pome fruit sauce as set forth in claim 1 wherein said dicing step is performed on uncored fruit characterized in that blossum ends of all fruit have been deliberately left in place.

3. The process of producing a pome fruit sauce in accordance with the process of claim 1 wherein said dices have a major dimension in excess of the cross-sectional dimension and wherein step (7) includes subjecting the removed dices to slicing normal to said major dimension, and again electronically assorting the dices to remove blemished dices.

4. The process of producing a pome fruit sauce in accordance with the process of claim 1 preceded by the step of chemically peeling the raw fruit.

5. The process of producing a pome fruit sauce in accordance with the process of claim 4 wherein the chemical peeling step comprises caustic immersion for a period within the range of 2–5 minutes followed by exposure to steam pressure in a closed chamber at above-atmospheric pressure.

6. A process of producing a pome fruit sauce in accordance with the process of claim 1 wherein said step of dicing comprises cutting the fruit into dices of a size substantially ½ × ½ inch in cross section and ranging from substantially ¾ to 3 inches in length.

7. A process for producing a pome fruit sauce, said process consisting essentially of the steps of
   A. introducing the untrimmed fruit into a process stream wherein it is subjected to the steps of
      1. dicing the untrimmed fruit to produce fruit tissue in the form of dices of relatively uniform size and of a configuration having substantial cubic dimensions throughout and including dices with blossom ends,
      2. washing the diced fruit to remove loose material resulting from the dicing operation, thereafter
      3. singulating and separating the dices,
      4. presenting the dices in a spaced single file product stream to an electronic inspection means,
      5. electronically inspecting and automatically assorting the dices to remove from said product stream blemished dices including those dices having blossom ends,
      6. passing the surviving unblemished dices along said processing stream,
      7. cooking and finishing said surviving unblemished dices to a sauce of a given finish,
      8. providing an auxiliary processing path wherein blemished dices are subject to cooking and finishing to a sauce of finer finish than said sauce of step (7) whereby blemished tissue is removed as tailings, and
      9. blending the sauces produced in steps (6) and (7), whereby the heretofore essential step of subjecting the fruit tissue to selective surface area trimming is obviated throughout said process.

8. The process of producing a pome fruit sauce as set forth in claim 7 wherein said dicing step is performed on uncored fruit characterized in that blossom ends of all fruit have been deliberately left in place.

9. The process of producing a pome fruit sauce in accordance with the process of claim 7 wherein said dices have a major dimension in excess of the cross-sectional dimension and wherein step (8) is preceded by a step of subjecting the removed dices to slicing normal to said major dimension, and again electronically assorting the dices to remove blemished dices.

10. The process of producing a pome fruit sauce in accordance with the process of claim 7 preceded by the step of chemically peeling the raw fruit.

11. The process of producing a pome fruit sauce in accordance with the process of claim 10 wherein the chemical peeling step comprises caustic immersion for a period within the range of 2–5 minutes followed by exposure to steam pressure in a closed chamber at above-atmospheric pressure.

12. A process of producing a pome fruit sauce in accordance with the process of claim 7 wherein said step of dicing comprises cutting the fruit into dices of a size substantially ½ × ½ inch in cross section and ranging from substantially ¾ to 3 inches in length.

13. The process of producing a pome fruit sauce in accordance with the process of claim 3 wherein
   blemished dices removed in step (5) are subjected to the steps of cooking and finishing to a sauce of sufficiently fine finish to remove blemished tissue as tailings,
   step (8) comprises cooking and finishing the unblemished tissue to a sauce of coarser finish than that at which blemishes, if present, would have been removed as tailings, and
   blending the sauces produced in steps (5) and (8),
   whereby the heretofore essential step of subjecting the fruit tissue to selective surface area trimming is obviated throughout the process.

* * * * *